United States Patent [19]
Kogure

[11] Patent Number: 5,663,985
[45] Date of Patent: Sep. 2, 1997

[54] COMMUNICATION APPARATUS AND METHOD IN A FIELD BUS SYSTEM

[75] Inventor: Makoto Kogure, Hitachinaka, Japan

[73] Assignee: Hitachi, Ltd., Tokyo, Japan

[21] Appl. No.: 450,201

[22] Filed: May 25, 1995

[30] Foreign Application Priority Data

May 31, 1994 [JP] Japan .................................. 6-118018

[51] Int. Cl.$^6$ .................................................. H04L 27/00
[52] U.S. Cl. .......................... 375/259; 375/282; 332/112
[58] Field of Search .................................. 375/282, 292, 375/259; 341/53; 332/112

[56] References Cited

U.S. PATENT DOCUMENTS

| | | | |
|---|---|---|---|
| 2,919,428 | 12/1959 | Dimond | 341/53 |
| 3,760,412 | 9/1973 | Barnes | 340/347 |
| 3,980,825 | 9/1976 | Morrien | 178/67 |
| 4,003,041 | 1/1977 | Van Duuren et al. | 340/347 |
| 5,042,053 | 8/1991 | Hoppes | 375/106 |
| 5,420,844 | 5/1995 | Kawakubo et al. | 369/59 |

FOREIGN PATENT DOCUMENTS 5-041709  2/1993  Japan .

OTHER PUBLICATIONS

Field Bus Japanese Committee (JEIDA), Mar. 1993: *Proposal of New Signal Transmitting System for Field Bus.*

Primary Examiner—Stephen Chin
Assistant Examiner—Mohammad Ghayour
Attorney, Agent, or Firm—Kenyon & Kenyon

[57] ABSTRACT

A Manchester code signal is used as a communication signal to be superimposed onto an operating current. The amplitude value in the plus direction with respect to an average current value is made larger than that in the minus direction, and the time width of an "H" level in one bit time is made smaller than that of an "L" level so as to establish the average current value into a low level. Accordingly, it is possible to make the average current value at the time of not-communication equal to that at the time of communication, and it is also possible to establish the average current value to a low level.

30 Claims, 7 Drawing Sheets

FIG.8

| INFORMATION BIT | FORMER HALF OF BIT TIME | LATTER HALF OF BIT TIME |
|---|---|---|
| 0 | 0 | 1 |
| 1 | 1 | 0 |
| N+ | 1 | 1 |
| N- | 0 | 0 |

FIG.9

| PREAMBLE | START DELIMITER | DATA | END DELIMITER |
|---|---|---|---|
| 1 BYTE | 1 BYTE | 8 ~ 300 BYTES | 1 BYTE |

```
                                    (MSB)                    (LSB)
PREAMBLE (1 BYTE)                    1   0   1   1   0   1   0
START FRAME DELIMITER (1 BYTE)       1  N+  N-   1   0  N-  N+   0
DATA (8 ~ 300 BYTES)                 (INCLUDE ONLY SIGN OF 0 AND 1)
END FRAME DELIMITER (1 BYTE)         1  N+  N-  N+  N-   1   0   1
```

COMMUNICATION APPARATUS AND METHOD IN A FIELD BUS SYSTEM

BACKGROUND OF THE INVENTION

A so-called field device is designed so as to detect a physical quantity such as pressure, temperature, flow, or the like, in various kinds of plants, to convert the detected value into an electric signal, to transmit the electric signal to upper rank apparatus through a transmission path or, conversely to receive control signals transmitted from the upper rank apparatus to thereby control valves, and so on, of the plant. As for the transmission of electric signals, they are standardized if they are analog signals, and analog current signals of 4 to 20 mA are transmitted between the field devices and the upper rank apparatus. Generally, one-way communication with analog signals is performed between field devices and upper rank apparatus.

Recently, as the technique of semiconductor integrated circuits has advanced, a field device including a microprocessor has been developed and realized. According to this, not only the above-mentioned one-way communication with analog signals, but also bidirectional communication with digital signals can be performed on a transmission path, so that the establishment of the range of the field device, the self-diagnosis thereof, and so on, can be instructed by remote control.

In addition, there has been recently proposed a field bus system in which a plurality of field devices are connected on one and the same transmission path by means of a multi-drop system so as to realize communication with only bidirectional digital signals.

In this field bus system, a plurality of field devices and upper rank apparatus are connected to form a tree structure through a transmission path. The plurality of field devices are operated through the transmission path by electric power supplied from an external power source so as to perform bidirectional communication with the upper rank apparatus on the transmission path by use of digital signals sequentially, and perform the transmission of detected physical quantity, the reception of a control value, and so on.

Upper communication apparatus are connected between the field devices and the upper rank apparatus or the external power source so as to perform bidirectional communication with the field devices, and so on, by use of digital signals. In addition, terminators respectively constituted by a resistor and a capacitor connected in series are connected on either side of the transmission path respectively.

In the case where an existing system of analog signals is replaced by such a field bus system, it is indeed necessary to change upper rank apparatus and field devices to those corresponding to field bus, but a transmission path can be used as it is. Accordingly, it is possible to shift the system easily, and it is possible to increase the number of field devices connected on the transmission path. It is therefore considered that the system can be extended easily.

However, when an existing system of analog signals is replaced by such a field bus system, a plurality of field devices are connected to a single transmission path, and digital communication is performed thereon. Accordingly, it is necessary to take the reliability of antinoise into consideration in comparison with the existing system. Further, a problem exists in that the control of field devices at a constant period cannot be performed if communication failure occurs frequently.

The field bus system is used for measurement and control operation in various kinds of plants. In the field bus system, the physical quantity in the plant is detected at intervals of a predetermined period (for example, 0.5 seconds), and the control instruction is operated on the basis of the detected physical quantity. The operated control instruction is supplied to a field device controlling a valve, or the like, at intervals of the predetermined period. If the physical quantity is not detected at the predetermined period, the field device cannot be controlled correctly Therefore, the physical quantity must be detected at the predetermined intervals correctly, and the control instruction must be supplied to the field device at the predetermined intervals correctly. In the field bus system, the communication between the field devices and the upper rank apparatus, or the like, is performed, and the detection of the physical quantity is performed at the predetermined intervals.

Therefore, if the communication failure occurs frequently, the physical quantity cannot be detected correctly at the predetermined intervals, and consequently, the field device cannot be controlled correctly.

In the case of a field bus system, a transmission path has characteristics that the transmission distance is so long that the attenuation, rounding and distortion of a transmission signal are very large depending on conditions in comparison with a usual communication network. In addition, such a field bus system is installed in a field so that noise environment is strict. Taking the above points into consideration, communication signals of respective devices are set to large values in a range of from 0.75 to 1.0 $V_{p-p}$. In the case of field devices, operation power is supplied through the transmission path, so that communication signals are electric current signals in a range of from 15 to 20 $mA_{p-p}$.

In view of the above communication signals, it has therefore been necessary to set the electric current consumption of the field device to a value of 8 mA or more. That is, in order to superimpose communication signals in a range of ±7.5 to 10 $mA_{p-p}$ onto a DC operating current, it is necessary to set the value of the DC operating current to 8 mA or more. Therefore the number of field devices which can be connected to the field bus, under conditions which are intrinsically safe and timeproof, with limited energy, i.e., a limited power supply, has been restricted to a small number.

In a signal transmission method disclosed in JP-A 5-41709, therefore, in a field bus system, a DC current is set to a low level when no communication signal is transmitted, while the DC current level is increased at the time of communication signal transmission so as to reduce the electric current consumption per field device, and hence increase the number of field devices which can be connected to the field bus system.

That is, for example, the DC current level is set to 4 mA when no communication signal is transmitted, while the DC current level is increased to 8 mA at the time of communication signal transmission. Since it is considered to be a rare case when a plurality of field devices transmit signals at the same time, the electric current consumption of the field devices is reduced, and the number of the field devices which can be connected to the field bus system can therefore be increased.

However, in the signal transmission method disclosed in the above-mentioned JP-A 5-41709, the voltage of a transmission path becomes oscillatory when the DC current level is changed from a low level to a high level, for example, from 4 mA to 8 mA, so that the reliability of communication signals is reduced. Therefore, in the signal transmission method according to the above-mentioned publication, the DC current level is increased from 4 mA to 8 mA gradually, and decreased from 8 mA to 4 mA gradually.

Therefore, in the signal transmission method according to the above-mentioned publication, not only is it necessary to provide means for increasing the DC current level at the time of transmission, and for decreasing the DC current level at the time of non-transmission, but it is also necessary to provide means for relaxing the increase and decrease of the DC current level. Accordingly, the structure is complicated.

SUMMARY OF THE INVENTION

It is an object of the present invention to realize a communication apparatus and a communication method in a field bus system in which the electric current consumption of field devices can be reduced with a simple structure.

In order to attain the foregoing object, according to an aspect of the present invention, one bit period of a digital signal waveform to be transmitted is constituted by a first period larger than the period of an operating current by a first predetermined value and a second period smaller than the period of the operating current by a second predetermined value which is smaller than the first predetermined value, and the product between the first predetermined value and the first period is made approximately equal to the product between the second predetermined value and the second period.

BRIEF DESCRIPTION OF THE DRAWINGS

FIG. 8 is a table in which an NRZ signal and a Manchester code signal are compared; and FIG. 9 is a diagram illustrating an example of a data structure of a communication signal.

DETAILED DESCRIPTION

An embodiment of the present invention will be described below with reference to the drawings.

Figure 1:
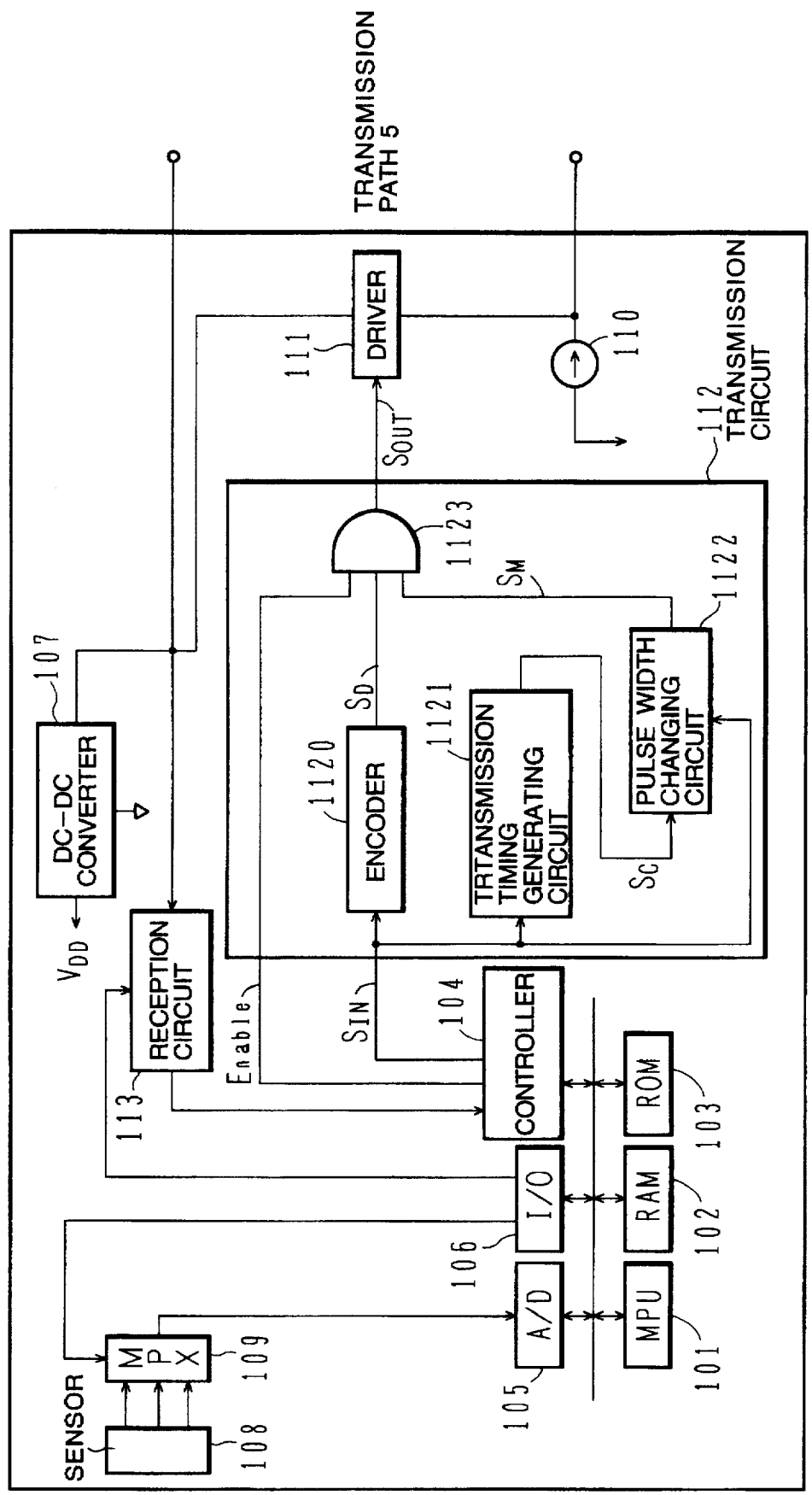
FIG. 1 is a schematic configuration diagram illustrating the structure of a communication apparatus which is an embodiment of the present invention.
Figure 6:
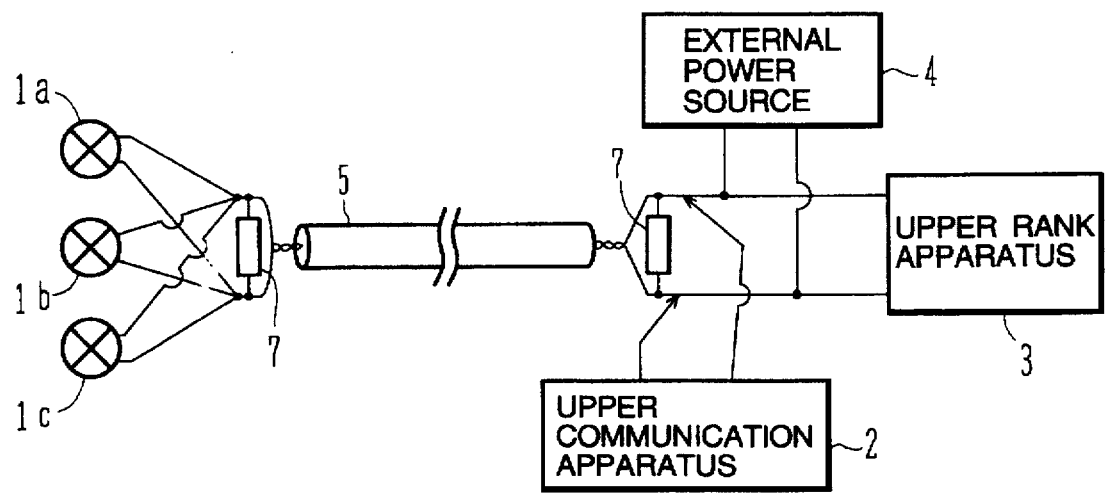
FIG. 6 is a schematic configuration diagram illustrating the structure of a field bus system to which an embodiment of the present invention is applied.

FIG. 1 is a schematic configuration diagram illustrating a communication apparatus which is an embodiment of the present invention; and FIG. 6 is a schematic configuration diagram illustrating a field bus system to which the embodiment of the present invention is applied.

First, in FIG. 6, field devices (terminal devices) 1a, 1b and 1c are designed to perform bidirectional communication with an upper rank apparatus 3 by use of digital signals so as to detect physical quantities such as pressure, temperature, flow, and so on, in processes in various plants, to transmit the detected values, and to receive control quantities of valves, and so on. The field devices 1a, 1b and 1c are operated by the power supplied from an external power source 4 through a transmission path 5, and can be connected to desired points of the transmission path 5. Although the field devices 1a, 1b and 1c are connected with a junction box (not shown) on the field side in the embodiment of FIG. 6, for example, the field devices 1a, 1b and 1c may be connected on the way of the transmission path 5.

The upper rank apparatus 3 performs communication with the field devices 1a, 1b and 1c, a field bus corresponding apparatus, such as an upper communication apparatus 2, or the like, through the transmission path 5 by use of digital signals so as to receive various kinds of physical quantities (pressure, temperature, flow, and so on) detected by the field devices 1a, 1b and 1c, and to transmit control signals of valves, and so on, as control information of the plants to the field devices 1a, 1b and 1c.

The upper communication apparatus 2 can be connected to a desired point on the transmission path 5. If a display or a keyboard in the upper communication apparatus 2 is operated, processing such as monitoring of output values of the field devices 1a, 1b and 1c, adjusted values, and so on, can be executed.

Each terminator 7 is constituted by a series connection of a resistor and a capacitor, and is connected to either side of the transmission path 5. This terminator 7 is made to take a value much smaller than input impedance in the communication frequency band of the field devices 1a, 1b and 1c connected onto the transmission path 5 so as to restrain communication signals from being affected by conditions such as connection points of the field devices, the number of the connected field devices, and so on.

Therefore, if the terminator 7 is detached from the transmission path 5, the impedance of the transmission path 5 in reference to the field devices becomes so large that signals transmitted from the respective field devices change in the direction where they turn large. Then, even if the size of a signal transmitted from a field device connected to the field bus is constant, the size of the signal is different and uneven in accordance with places on the transmission path 5 depending on the conditions such as a system of its driver circuit, the length of the transmission path, the form of the connection, and so on.

A communication apparatus in the embodiment of the present invention can be used in common with field bus corresponding apparatus such as the field devices 1 (1a, 1b and 1c), the upper communication apparatus 2, the upper rank apparatus 3, and so Next, a Manchester code signal used as a communication signal in the present invention will be described.

Figure 7:
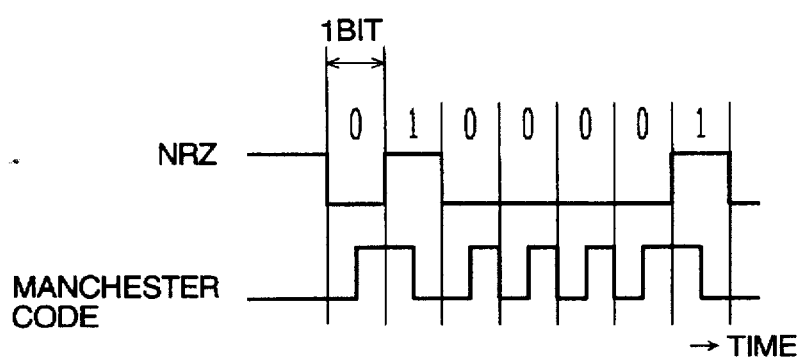
FIG. 7 is a waveform diagram in which an NRZ signal and a Manchester code signal are compared.

FIG. 7 is a waveform diagram in which an NRZ (Not-Return-to-Zero) signal and a Manchester code signal are compared; and FIG. 8 is a table in which an NRZ signal and a Manchester code signal are compared.

In FIGS. 7 and 8, an NRZ signal takes an "H (High)" level for the entirety of one bit time when it indicates "1", and takes an "L (Low)" level for the entirety of one bit time when it indicates "0".

On the other hand, a Manchester code signal takes an "H" level for the former period of one bit time and an "L" level for the latter period of the one bit time when it indicates "1", and takes the "L" level for the former period of one bit time and the "H" level for the latter period of the one bit time when it indicates "0".

In a Manchester code signal, therefore, "1" and "0" are determined by the exchangeable combination of "H" and "L" level in the former and latter periods of one bit time signal, so that the time of the "H" level is always the same in the respective one bit times if it is a data signal.

FIG. 9 is a data configuration diagram of a communication signal.

Describing the operation of communication with reference to FIG. 9, synchronizing processing is performed for every one byte of data received continuously in accordance with a preamble which is data received at the beginning, and decoding processing of Manchester code signals is performed upon the following data. Next, a start delimiter is detected, and synchronizing processing is performed for every one byte of communication data. The following data are extracted as available data until the signal pattern of an end delimiter is detected.

In the present invention, Manchester code signals are used as communication signals superimposed onto a DC current (operating current). The amplitude value in the plus direction with respect to an average current value is made larger than that in the minus direction, and the time width of an "H" level in one bit time is smaller than that of an "L" level so that the average current value is set to a low level.

Figure 2:
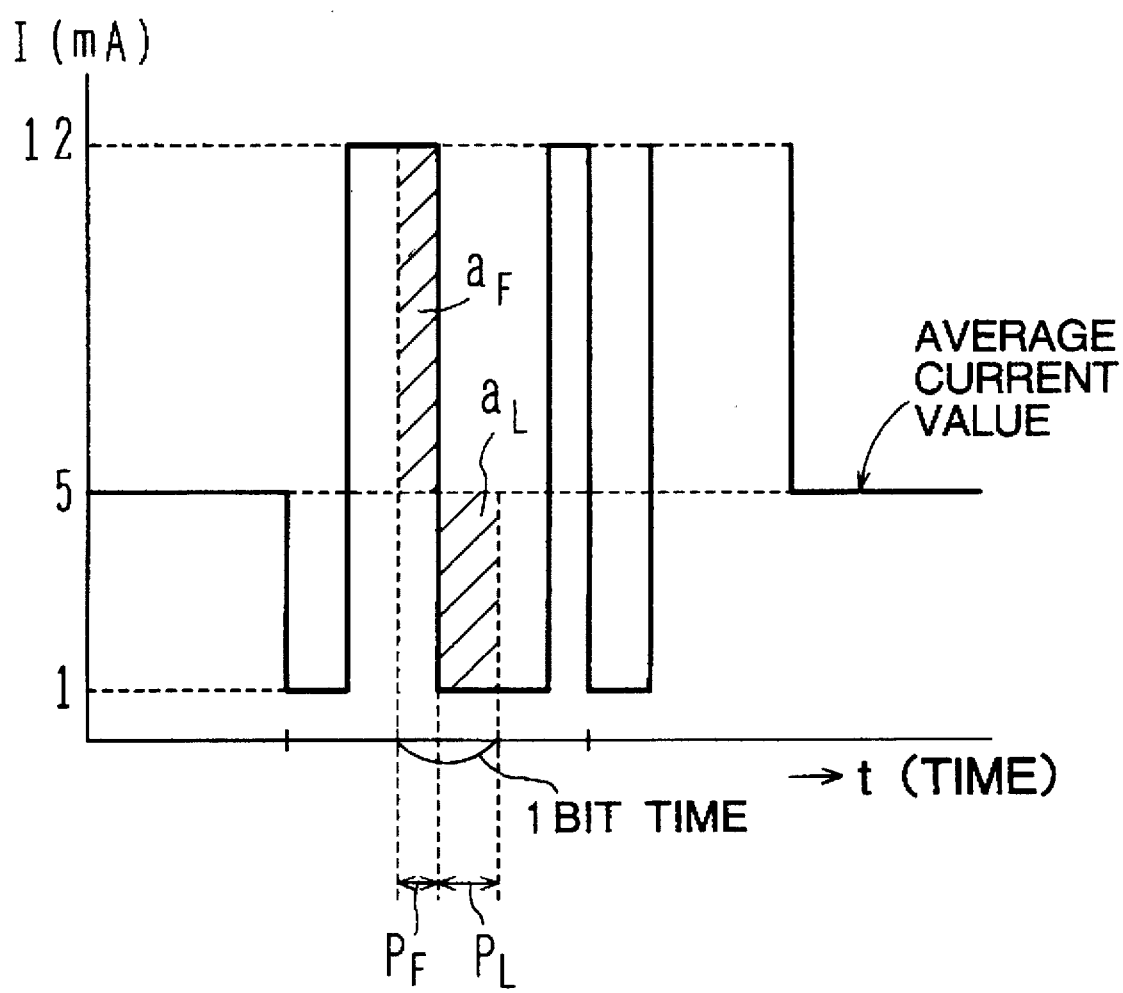
FIG. 2 is a diagram illustrating an example of a communication signal waveform used in the present invention.

That is, for example, the communication signal takes 12 mA as the "H" level while 1 mA as the "L" level, as shown in FIG. 2, and the average current value is 5 mA at the time of non-communication. In addition, the time width $P_F$ of the "H" level and the time width $P_L$ of the "L" level are established so that the area of the portion (hatched portion $a_F$) of the "H" level and the area (hatched portion $a_L$) of the portion of the "L" level are the same in one bit time. Therefore, the average current value at the time of non-communication becomes equal to the average current value at the time of communication, and the average current value can be established at a low level.

In an example of FIG. 2, the ratio of the time width $P_F$ to the time width $P_L$ is 4 to 7 because of $7P_F=4P_L$. Accordingly, the electrical current consumption of 8 mA or more which is normally required can be reduced to 5 mA. This ratio of the time width $P_F$ to the time width $P_L$ is realized by a transmission circuit 112 shown in FIG. 1.

Next, the configuration of a communication apparatus which is an embodiment of the present invention will be described with reference to FIG. 1.

In FIG. 1, a DC-DC converter 107 generates a voltage $V_{DD}$ for operating the field devices 1 on the basis of the voltage supplied from the external power source 4 through the transmission path 5. A constant-current circuit 110 controls the electrical current consumption of all the field devices 1 to be constant.

A combined sensor 108, for example, detects differential pressure of fluid, control, temperature, and so on, and outputs detection signals. The respective outputs of the sensor 108 are put into a multiplexer 109. An input switching signal is supplied to the multiplexer 109 from an I/O interface 106. An output signal of the multiplexer 109 is supplied to an A/D converter 105.

Further, a microprocessor 101 corrects the outputs sequentially supplied from the A/D converter 105 by use of various coefficients stored in a RAM 102 and a ROM 103 to thereby obtain true values and store the true values in the RAM 102. For example, coefficients expressing the relationship between static pressure values, temperature values, and true differential pressure values have been stored in the RAM 102 and the ROM 103, and detected differential pressure is corrected on the basis of these coefficients, and the detected values of static pressure, and temperature to thereby calculate a true differential pressure value. The calculated true differential pressure value is stored in the RAM 102.

A controller 104 supplies a transmission signal $S_{In}$ and a control signal (Enable), which shows the available/unavailable of the transmission signal to the transmission circuit 112, on the basis of a command signal from the microprocessor 101. In addition, a reception signal is supplied to the controller 104 from a reception circuit 113, and the controller 104 supplies the supplied reception signal to the microprocessor 101.

The transmission circuit 112 has an encoder 1120 to which the transmission signal $S_{In}$ is supplied from the controller 104, and a transmission timing generating circuit 1121. The transmission circuit 112 also has a pulse width changing circuit 1122 supplied with the transmission signal $S_{In}$ from the controller 104, and an output signal $S_c$ from the transmission timing generating circuit 1121. Further, the transmission circuit 112 has an AND circuit 1123 supplied with the control signal (enable) from the controller 104, an output signal $S_D$ from the encoder 1120, and an output signal $S_M$ from the pulse width changing circuit 1122. An output signal $S_{OUT}$ from the AND circuit 1123 is supplied to a driver 111.

The field devices 1 perform communication as follows.

Figure 3:
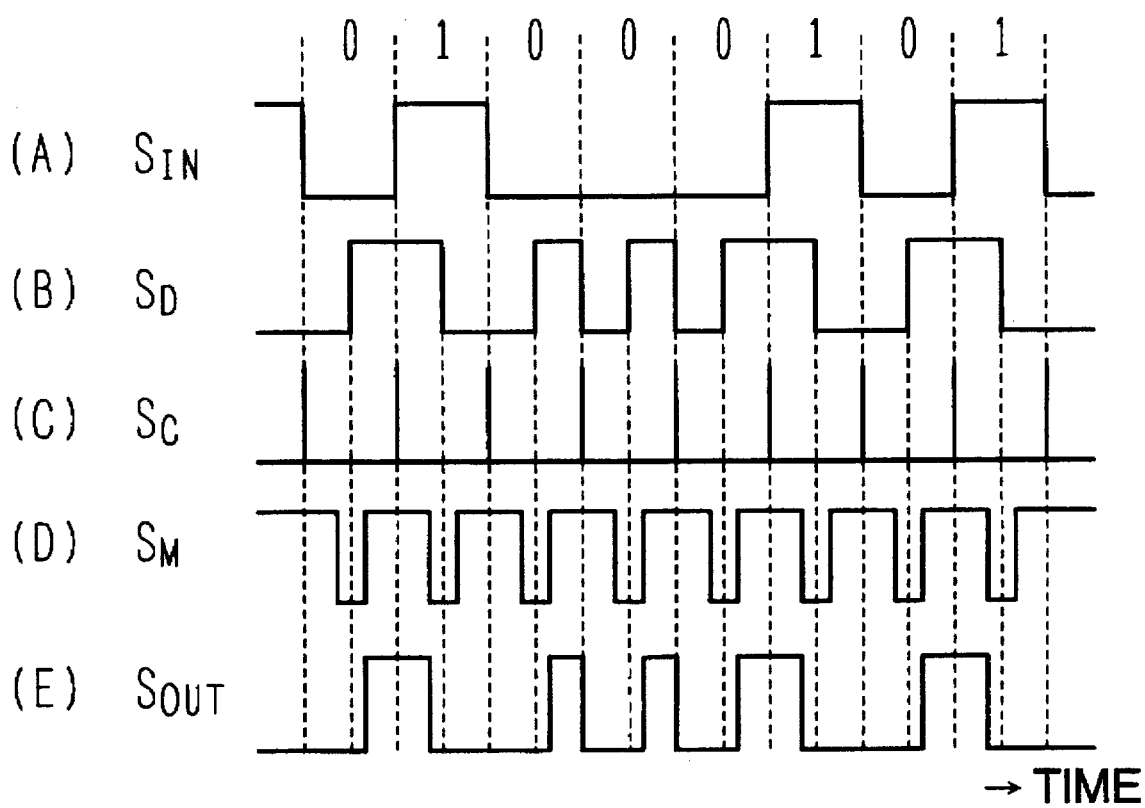
FIG. 3 is a timing chart of a signal in a transmission circuit in the schematic configuration diagram of FIG. 1.

In the operation of transmission, first, the controller 104 extracts data and so on stored in the RAMS 102 in response to the instruction of the microprocessor 101, and supplies a serial digital signal $S_{In}$ (shown in FIG. 3A) to the transmission circuit 112. This signal $S_{In}$ is supplied to the encoder 1120, and converted into a Manchester code signal $S_D$ (shown in FIG. 3B). On the other hand, the transmission timing generating circuit 1121 generates a timing signal $S_c$ (shown in FIG. 3C) showing a section of each bit from the supplied signal $S_{In}$.

From the timing signal $S_c$ and the signal $S_{In}$, the pulse width changing circuit 1122 generates a signal $S_M$ which takes the "H" level for a period $T_0$ shorter than a half of one bit time in the former period of the one bit time, and takes the "H" level for the same period $T_0$ in the latter period for the same period. When a control signal (Enable) from the controller 104 shows that a transmission signal is available, logical product operation to obtain a logical product between the signals $S_D$ and $S_M$ is performed by the AND circuit 1123 so as to output a Manchester code signal $S_{OUT}$ (shown in FIG. 3E).

This signal $S_{OUT}$ has a shorter period of the "H" level than the signal $S_D$, and a signal having a waveform as shown in FIG. 2 is outputted to the transmission path from the driver 111.

As the coding system, for example, there is a method of changing to Manchester codes of a base band signal. As the driver system, there are a system of outputting a voltage signal, and a system of outputting a current signal.

Next, the operation when the field devices 1 receive communication signals will be described.

A communication signal from the transmission path is decoded in the reception circuit 113, so that the coded signal is converted to the form of the above-mentioned serial digital signal array. The converted reception signal is put from the reception circuit 113 into the controller 104 as data constituted by digital signals "1" and "0" The signal put into the controller 104 is extracted as reception data by the microprocessor 101. Respective conditions of inner circuits of the reception circuit 113 can be changed through the I/O interface by the instruction of the microprocessor 101.

Figure 4:
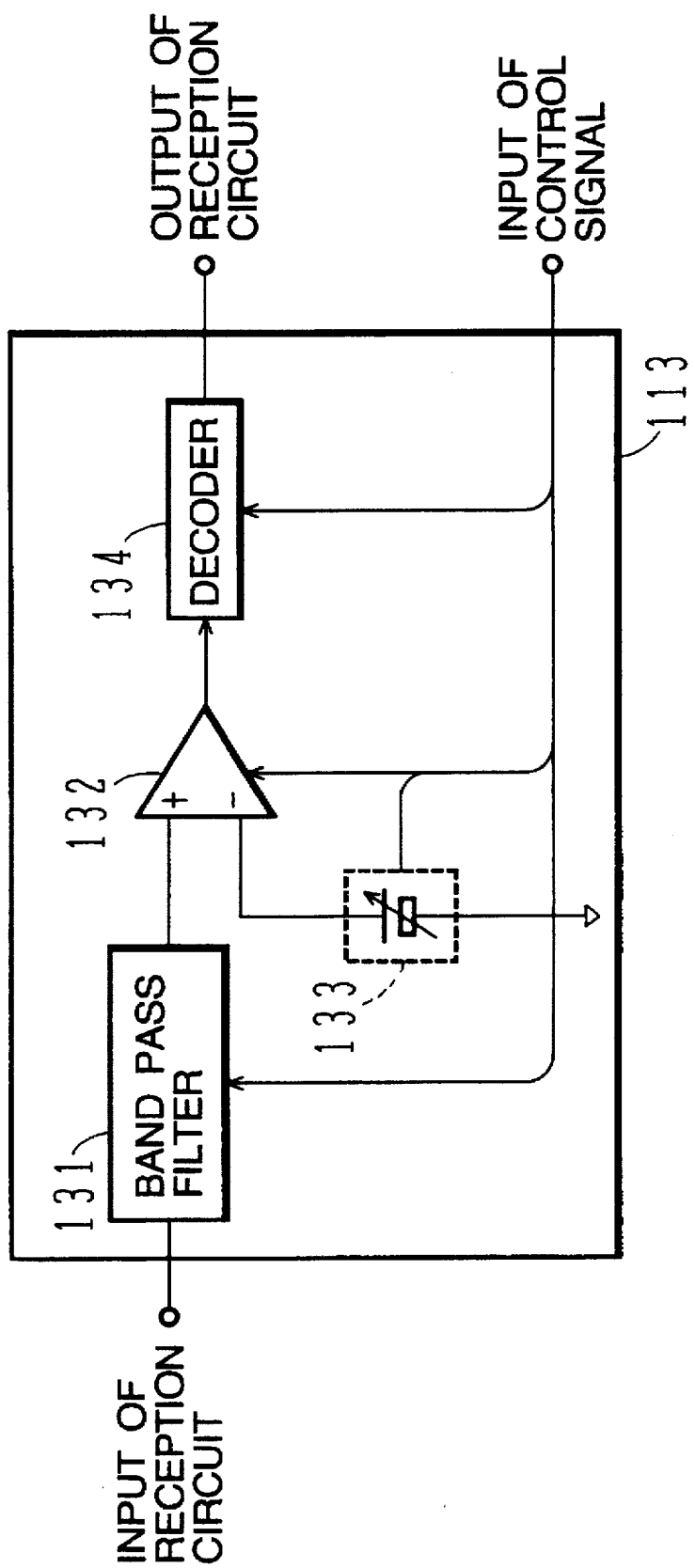
FIG. 4 is an internal block diagram of the transmission circuit in the schematic configuration diagram of FIG. 1.

FIG. 4 is an internal block diagram of the reception circuit 113.

In FIG. 4, since a reception signal from the transmission path passes through a band pass filter 131, only the component of a communication frequency band of the coded signal is extracted therein so that noises other than the communication frequency band are eliminated. An output signal of the band pass filter 131 is compared with comparative voltage supplied from a comparative voltage generator 133 in a comparator 132, and only a signal component higher than this comparative voltage is extracted as a coded digital signal. The extracted digital signal is decoded to a serial digital signal by a decoder 134.

The decoder 134 divides one bit period of a Manchester code signal into periods of the former and latter periods, and determines whether the output signal from the comparator 132 is more than a predetermined level or not in each period of the former and latter periods so as to decode the Manchester code signal. This decoded signal is supplied to the controller 104.

A control signal from the I/O interface 106 is supplied to the band pass filter 131, the comparator 132, the comparative voltage generator 133 and the decoder 134, so that the conditions of these can be changed.

The comparative voltage from the comparative voltage generator 133 is made larger than the noise level of the communication frequency band mixed in communication signals so as to eliminate the effect of noises of the communication frequency band. In addition, if the hysteresis characteristic of the comparator 132 is used, there is no chattering in an output signal of the comparator 132. Accordingly, in the decoder 134, without performing correction or the like upon the output signal of the comparator 132, it is possible to take synchronizing timing in the signal directly. With reference to this synchronizing timing, coded signals are decoded inside the decoder 134 so as to output them as digital signals of "1" and "0".

Figure 5:
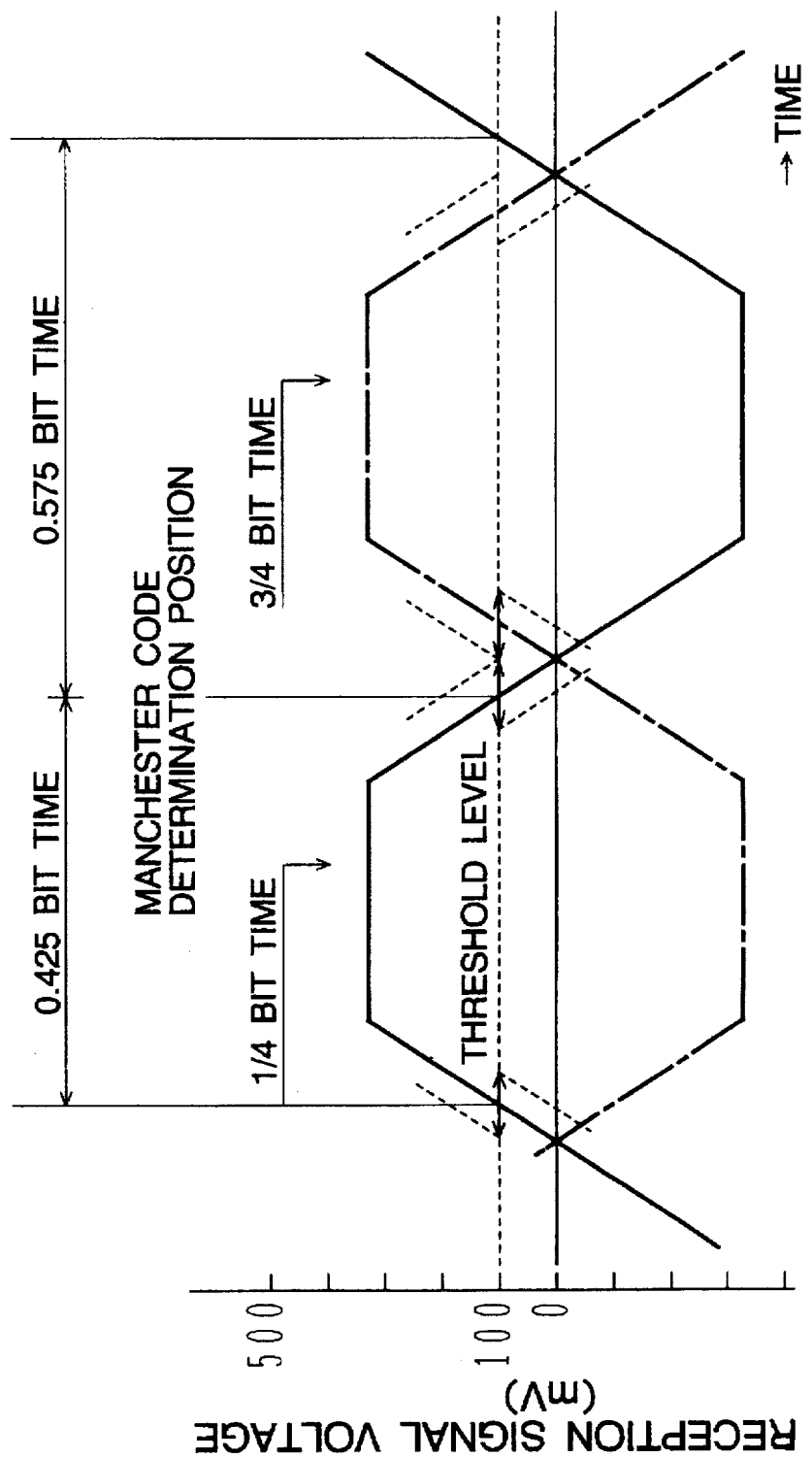
FIG. 5 is a diagram illustrating an example of a signal transmission waveform in a field bus system used in the present invention, and for explaining a reception signal.

FIG. 5 is a waveform diagram of a reception signal.

In FIG. 5, a signal transmission waveform in the field bus is trapezoid in order to avoid interference in other networks. In addition, attenuation, rounding and distortion are given to an actually received waveform in accordance with the length of the transmission path, the number of connected devices, and so on.

In this example, the comparative voltage (threshold level) of the comparator 132 is made 100 mV, and synchronizing timing per bit is made at the leading edge timing of output signals of the comparator 132. In addition, as for the Manchester code signal, the former period is 0.425 bit time, and the latter period is 0.575 bit time. The both are balanced badly. However, it is possible to decode Manchester codes accurately by means of such a simple processing that the Manchester codes are determined in the positions of ¼ bit time and ¾ bit time as shown in FIG. 5. It is therefore possible to receive a communication signal without any problem even if the communication signal has a communication signal waveform shown in FIG. 2.

As has been described, according to an embodiment of the present invention, the time width of an "H" level in one bit time of the Manchester code signal is smaller than that of an "L" level so as to reduce an average current value without changing the average current value at the time of non-communication and the average current value at the time of communication. Therefore, it goes well only if the time width of a Manchester code signal is adjusted. Accordingly, in spite of a simple structure, it is possible to reduce the electric current consumption of field devices, and particularly, it is possible to realize a communication apparatus in which the number of field devices connectable to a field bus system can be increased under intrinsically safe and flame-proof conditions.

In addition, according to another embodiment of the present invention, taking attenuation, rounding, distortion, and so on, of reception signals into consideration, comparative voltage of the comparator 132 is established high, and the position of determining Manchester codes is set high. Accordingly, decoding processing can be performed with high reliability.

In addition, a communicatable range in connection with external conditions such as the length of a transmission path, the number of connected devices, and so on, can be extended.

In FIG. 4, if Manchester codes are used as communication data, the communication frequency band of Manchester codes includes a low band, so that the cutoff frequency on the high frequency pass side of the band pass filter 131 is necessary to be established to a low band within a region where noises of a commercial power source can be eliminated.

For example, if there is a difference of upper and lower amplitudes in a communication signal, and an average current value flowing in the transmission path at the time of communication changes larger than that at the time of silence, it is necessary to change the filter characteristic such as cutoff frequency on the high frequency pass side of the band pass filter 131, and so on, so as to eliminate the influence of this change. Under this condition, there is a case where attenuation or rounding is given to the waveform of an output signal of the band pass filter 131 in comparison with that before the filter characteristic is changed.

In this case, if the comparative voltage of the comparator 132, the above-mentioned timing of determining Manchester codes, and so on, are changed at the same time, it is possible to keep the reliability of communication. In such a manner, it is possible to extend an allowable value of the difference between upper and lower amplitudes of the communication apparatus.

In addition, the respective conditions of the filter characteristic of the band pass filter 131, the comparative voltage of the comparator 132, the hysteresis characteristic of the comparator 132, and the identification timing of the decoder 134 can be changed over, and the conditions of respective components other than these examples can be changed over in accordance with a reception signal, so that it is possible to improve the reliability of communication.

As for the above operations, by performing the detection of abnormality in received data and the changeover of the conditions of the respective components synchronously, it is possible to change over the conditions to the direction where the data can be received accurately. Particularly, if respective devices perform loop back test periodically by self-diagnosis or the like, and perform the above-mentioned changeover of the conditions, it is possible to perform communication without any influence of external conditions such as the length of the transmission path, the number of connected devices and so on by which attenuation, rounding or distortion is given to the waveform of communication signals.

What is claimed is:

1. A communication apparatus in a field bus system for performing communication between an upper rank apparatus and at least one terminal device which is connected to a transmission path having a transmission line and which is supplied with an operating current through said transmission path, by use of a communication signal superimposed onto said operating current and indicating a digital signal comprising:

an encoder receiving as an input a digital signal to be communicated and providing as an out put a signal divided into a plurality of bit times, each bit time indicating a "1" or "0" by means of a pulse of said operating current in a positive direction in one of a former or a later part of said bit period and a pulse of said operating current in a negative direction in the other of said former or a later part of said bit time, the order of said positive and negative directions indicating whether a "1" or "0" is represented;

a pulse width than in circuit, generating as an output a series of pulses, each pulse being at a high level in a positive direction and starting in a later period of one bit time and ending in the former period of the next adjacent bit time, the period when said pulse signal is at a higher level in each of said later and former periods being shorter than a half period of said bit time;

a logic circuit having as input the outputs of said encoder and said pulse width changing circuit, forming, at its output, a logical product between the output of said encoder and the output of said pulse width changing circuit; and a driver having said output signal of said logic device and said operating current, as inputs and superimposing the output of said logic circuit on said operating current such that a communication signal in which a product obtained by multiplying the period during which said communication signal is at a high level by the value of said operating current while at said high level of said communication signal is approximately equal to a product obtained by multiplying the period during which said communication signal is at a low level by the value of said operating current while at said low level of said communication signal.

2. A communication apparatus in a field bus system according to claim 1, wherein said period during which said communication signal is at a high level is smaller than said period during which said communication signal is at a low level.

3. A communication apparatus in a field bus system according to claim 2, and further including a receiving portion for receiving said communication signal, and for decoding said received communication signal into a digital signal having the format of said digital signal input to said encoder.

4. A communication apparatus in a field bus system according to claim 3, wherein said communication signal is encoded in a Manchester code, and said receiving portion has a comparison/selection means for comparing the level of said received communication signal with a reference level, and for outputting a signal having level higher than said reference level, and a decoding means for converting said output signal from said comparison/selection means into a digital signal having the format of said digital signal input to said encoder.

5. A communication apparatus in a field bus system according to claim 4, wherein said decoding means divides one bit period of a Manchester code signal into two period portions including a former period and a latter period, and determines whether said output signal from said comparison/selection means is less than or not less than a predetermined level in each of said period portions of the former and latter periods so as to decode said Manchester code signal.

6. A communication apparatus in a field bus system according to claim 4, wherein said receiving portion has a signal selection means for passing only a predetermined frequency band of said received signal, and for supplying said passed signal to said comparison/selection means, said pass frequency band of said signal selection means being changeable, said predetermined reference level of said comparison/selection means being also changeable.

7. A communication method in a field bus system for performing communication between an upper rank apparatus and at least one terminal device which is connected to a transmission path having a transmission line and which is supplied with an operating current through said transmission path, by use of a communication signal superimposed onto said operating current and indicating a digital signal comprising:

encoding a digital signal to be communicated into an encoded output signal divided into a plurality of bit times, each bit time indicating a "1" or "0" by means of a pulse of said operating current in a positive direction in one of a former or a later part of said bit period and a pulse of said operating current in a negative direction in the other of said former or a later part of said bit time, the order of said positive and negative directions indicating whether a "1" or "0" is represented;

generating a series of pulses, each pulse being at a high level in a positive direction and starting in a later period of one bit time and ending in the former period of the next adjacent bit time, the period when said pulse signal is at a higher level in each of said later and former periods being shorter than a half period of said bit time;

forming a logical product of said encoded out put a signal and said pulse signal; and superimposing said logical product on said operating current such that a communication signal in which a product obtained by multiplying the period during which said communication signal is at a high level by the value of said operating current while at said high level of said communication signal is approximately equal to a product obtained by multiplying the period during which said communication signal is at a low level by the value of said operating current while at said low level of said communication signal.

8. A communication method in a field bus system according to claim 7, wherein said period during which said communication signal is at a high level is smaller than said period during which said communication signal is at a low level.

9. A communication method in a field bus system according to claim 7, wherein said digital signal to be communicated is encoded into a Manchester code signal.

10. A communication method in a field bus system according to claim 9, and further including receiving said communication signal, and decoding said received communication signal into a digital signal having the format of said digital signal before being encoded.

11. A communication method in a field bus system according to claim 10, and further including comparing the level of said received communication signal with a predetermined reference level, and decoding the result of comparison into a digital signal having the format of said digital signal before being encoded.

12. A communication method in a field bus system according to claim 11, and further including passing only a predetermined frequency band of said received signal, and comparing the level of said passed communication signal with a predetermined reference level, and decoding the result of comparison to a digital signal having the format of said digital signal before being encoded.

13. A communication method in a field bus system according to claim 11, comprising comparing the level of said received communication signal with a predetermined reference level so as to extract a signal more than or equal to said reference level, dividing one bit period of a Manchester code signal into two period portions of former and latter periods, and making a determination as to whether said extracted signal is less than or not less than a predetermined level in each of said period portions of the former and latter periods to thereby decode said Manchester code signal.

14. A communication method in a field bus system according to claim 13, comprising comparing the level of said received communication signal with a predetermined reference level so as to extract a signal not less than said reference level, dividing one bit period of a Manchester code signal into two period portions of former and latter periods, and making a determination as to whether said extracted signal is less than or not less than a predetermined level by predetermined determination timing in each of said period portions of the former and latter periods to thereby decode said Manchester code signal.

15. A communication method in a field bus system according to claim 11, wherein respective conditions of said predetermined reference level, said predetermined frequency band, and said predetermined determination timing are changeable so that they are changed desirably in accordance with a received communication signal.

16. A communication method in a field bus system according to claim 15, comprising synchronously performing the detection of abnormality in received data, and the change of the respective conditions of said predetermined reference level, said predetermined frequency band, and said predetermined determination timing.

17. A communication method in a field bus system according to claim 12, comprising comparing the level of said received communication signal with a predetermined reference level so as to extract a signal more than or equal to said reference level, dividing one bit period of a Manchester code signal into two period portions of former and latter periods, and making a determination as to whether said extracted signal is less than or not less than a predetermined level in each of said period portions of the former and latter periods to thereby decode said Manchester code signal.

18. A communication method in a field bus system according to claim 17, comprising comparing the level of said received communication signal with a predetermined reference level so as to extract a signal not less than said reference level, dividing one bit period of a Manchester code signal into two period portions of former and latter periods, and making a determination as to whether said extracted signal is less than or not less than a predetermined level by predetermined determination timing in each of said period portions of the former and latter periods to thereby decode said Manchester code signal.

19. A communication method in a field bus system according to claim 12, wherein respective conditions of said predetermined reference level, said predetermined frequency band, and said predetermined determination timing are changeable so that they are changed desirably in accordance with a received communication signal.

20. A communication method in a field bus system according to claim 13, wherein respective conditions of said predetermined reference level, said predetermined frequency band, and said predetermined determination timing are changeable so that they are changed desirably in accordance with a received communication signal.

21. A communication method in a field bus system according to claim 14, wherein respective conditions of said predetermined reference level, said predetermined frequency band, and said predetermined determination timing are changeable so that they are changed desirably in accordance with a received communication signal.

22. A communication method in a field bus system according to claim 17, wherein respective conditions of said predetermined reference level, said predetermined frequency band, and said predetermined determination timing are changeable so that they are changed desirably in accordance with a received communication signal.

23. A communication method in a field bus system according to claim 18, wherein respective conditions of said predetermined reference level, said predetermined frequency band, and said predetermined determination timing are changeable so that they are changed desirably in accordance with a received communication signal.

24. A communication method in a field bus system according to claim 19, wherein respective conditions of said predetermined reference level, said predetermined frequency band, and said predetermined determination timing are changeable so that they are changed desirably in accordance with a received communication signal.

25. A communication method in a field bus system according to claim 19, comprising synchronously performing the detection of abnormality in received data, and the change of the respective conditions of said predetermined reference level, said predetermined frequency band, and said predetermined determination timing.

26. A communication method in a field bus system according to claim 20, comprising synchronously performing the detection of abnormality in received data, and the change of the respective conditions of said predetermined reference level, said predetermined frequency band, and said predetermined determination timing.

27. A communication method in a field bus system according to claim 21, comprising synchronously performing the detection of abnormality in received data, and the change of the respective conditions of said predetermined reference level, said predetermined frequency band, and said predetermined determination timing.

28. A communication method in a field bus system according to claim 22, comprising synchronously performing the detection of abnormality in received data, and the change of the respective conditions of said predetermined reference level, said predetermined frequency band, and said predetermined determination timing are performed synchronously.

29. A communication method in a field bus system according to claim 23, comprising synchronously performing the detection of abnormality in received data, and the change of the respective conditions of said predetermined reference level, said predetermined frequency band, and said predetermined determination timing.

30. A communication method in a field bus system according to claim 24, comprising synchronously performing the detection of abnormality in received data, and the change of the respective conditions of said predetermined reference level, said predetermined frequency band, and said predetermined determination timing.

* * * * *

UNITED STATES PATENT AND TRADEMARK OFFICE
CERTIFICATE OF CORRECTION

PATENT NO. : 5,663,985
DATED : September 2, 1997
INVENTOR(S) : Makoto KOGURE et al.

It is certified that error appears in the above-identified patent and that said Letters Patent is hereby corrected as shown below:

| Column | Line | |
|---|---|---|
| 9 | 10 | Change "than in" to --changing--. |

Signed and Sealed this

Seventeenth Day of February, 1998

Attest:

BRUCE LEHMAN

Attesting Officer

Commissioner of Patents and Trademarks